US012090737B2

(12) United States Patent
Spies et al.

(10) Patent No.: US 12,090,737 B2
(45) Date of Patent: Sep. 17, 2024

(54) LAMINATE CONTAINING A METAL AND A POLYMER LAYER OF A POLYAMIDE AND AN ACRYLATE

(71) Applicant: BASF SE, Ludwigshafen am Rhein (DE)

(72) Inventors: Patrick Spies, Ludwigshafen (DE); Philippe Desbois, Ludwigshafen (DE); Jasmina Simon, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 320 days.

(21) Appl. No.: 17/274,632

(22) PCT Filed: Sep. 11, 2019

(86) PCT No.: PCT/EP2019/074257
§ 371 (c)(1),
(2) Date: Mar. 9, 2021

(87) PCT Pub. No.: WO2020/053293
PCT Pub. Date: Mar. 19, 2020

(65) Prior Publication Data
US 2022/0048282 A1 Feb. 17, 2022

(30) Foreign Application Priority Data
Sep. 14, 2018 (EP) .................................. 18194558

(51) Int. Cl.
| | | |
|---|---|---|
| B32B 27/34 | (2006.01) | |
| B32B 15/088 | (2006.01) | |
| B32B 15/18 | (2006.01) | |
| B32B 27/30 | (2006.01) | |
| B32B 37/06 | (2006.01) | |

(52) U.S. Cl.
CPC ............ B32B 27/34 (2013.01); B32B 15/088 (2013.01); B32B 15/18 (2013.01); B32B 27/308 (2013.01); B32B 37/06 (2013.01); B32B 2307/732 (2013.01)

(58) Field of Classification Search
None
See application file for complete search history.

(56) References Cited

U.S. PATENT DOCUMENTS

| | | | | |
|---|---|---|---|---|
| 3,373,223 A | * | 3/1968 | Armstrong | .............. C08L 23/10 |
| | | | | 525/183 |
| 4,690,856 A | * | 9/1987 | Ito | .............................. C09J 7/22 |
| | | | | 428/458 |
| 5,278,231 A | * | 1/1994 | Chundury | ............... C08L 23/02 |
| | | | | 525/66 |
| 6,306,954 B1 | * | 10/2001 | Nishikawa | ......... C09J 123/0869 |
| | | | | 524/514 |
| 10,611,929 B2 | | 4/2020 | He et al. | |
| 2009/0291288 A1 | | 11/2009 | Kopannia et al. | |
| 2011/0200816 A1 | * | 8/2011 | Mizrahi | .................. B32B 15/02 |
| | | | | 428/458 |

FOREIGN PATENT DOCUMENTS

| | | | | |
|---|---|---|---|---|
| CN | 1255937 A | 6/2000 | | |
| EP | 2085215 A1 | 8/2009 | | |
| JP | S59/11355 A | * | 1/1984 | ........... B32B 15/088 |
| JP | S6485754 A | 3/1989 | | |
| JP | 2010511082 A | 4/2010 | | |
| JP | 2013540833 A | 11/2013 | | |
| JP | 2018508380 A | 3/2018 | | |
| WO | 2005014278 A1 | 2/2005 | | |

OTHER PUBLICATIONS

La Mantia—LDPE PA6 ethylene acrylic acid copolymer blends—Macromol.Symp. 2003 (Year: 2003).*
Yoshiyasu—JP S59-11355 A—sis Jap. D1—MT—polyamide+olefin rubber+acrylate copolymer—metal—1984 (Year: 1984).*
1 European Search Report for EP Patent Application No. 18194558.5, Issued on Mar. 19, 2019, 3 pages.
International Search Report for corresponding PCT/EP2019/074257 mailed Nov. 7, 2019.

\* cited by examiner

*Primary Examiner* — John Vincent Lawler
(74) *Attorney, Agent, or Firm* — Armstrong Teasdale LLP

(57) ABSTRACT

Described herein is a laminate including at least one first layer of at least one first metal and at least one further layer of a polymer composition (PC). Also described herein is a process for producing the laminate.

8 Claims, No Drawings

LAMINATE CONTAINING A METAL AND A POLYMER LAYER OF A POLYAMIDE AND AN ACRYLATE

CROSS-REFERENCE TO RELATED APPLICATIONS

This application is a U.S. National Phase Application of International Patent Application No. PCT/EP2019/074257, filed Sep. 11, 2019, which claims the benefit of priority to European Patent Application No. 18194558.5, filed Sep. 14, 2018, the entire contents of which are hereby incorporated by reference herein.

The present invention relates to a laminate comprising at least one first layer of at least one first metal and at least one further layer of a polymer composition (PC) and to a process for producing the laminate of the invention.

A commonly encountered task in recent times is the provision of novel materials which are lighter than the materials used to date, especially for aircraft construction, automobile manufacture and boatbuilding. At the same time, these novel materials shall have the same mechanical properties, especially strength, stiffness and stability, as the known materials or even improve upon these. The novel materials shall additionally be formable by known processes, for example by deep drawing, rolling, bending, stamping or seaming.

WO 2005/014278 describes laminates comprising an adhesive polymer layer between two outer metal layers. This polymer layer comprises a nylon-6, nylon-6,6, nylon-11, nylon-12, nylon-4,6, nylon-6,10 or nylon-6,12 and a copolymer of ethylene and an unsaturated carboxylic acid and/or a carboxylic acid derivative and a reactive copolymer. The copolymer of ethylene and an unsaturated carboxylic acid and/or a carboxylic acid derivative may be grafted with polar groups.

A particular disadvantage of the laminates described in WO 2005/014278 is that they have only poor tensile strength particularly after storage in a humid environment. Furthermore, the polymer layer frequently has fluctuating moisture absorption, resulting in fluctuating bonding properties.

US 2011/0200816 describes laminates comprising two metal layers and an interposed polymer layer. The polymer layer comprises a nylon-6/6,6 copolymer, for example. Also described are various other thermoplastic polymers such as polyolefins and polyimides. The laminates described in US 2011/0200816 also exhibit only poor tensile strengths, particularly after storage in a humid environment, or are even destroyed to the point of being unusable by atmospheric humidity.

DE 10 2011 084519 describes sealing layers for solar cells which comprise a first outer layer, an intermediate layer and a second outer layer. The layers may comprise polyamides, for example nylon-6 or nylon-6,6.

It was thus the object of the present invention to provide a laminate and a process for production thereof, said laminate having the disadvantages of the laminates described in the prior art only to reduced degree, if at all.

This object was achieved by a laminate comprising at least one first layer of at least one first metal and at least one further layer of a polymer composition (PC), wherein the polymer composition (PC) comprises the following components:
(A) at least one polyamide,
(B) at least one first copolymer obtainable by polymerizing at least the following components:
(B1) at least one first $C_2$-$C_{20}$-alkene and
(B2) at least one second $C_2$-$C_{20}$-alkene,
where components (B1) and (B2) are different than one another,
(C) at least one second copolymer obtainable by polymerizing at least the following components:
(C1) at least one third $C_2$-$C_{20}$-alkene and
(C2) at least one acrylic acid derivative.

It has been found that, surprisingly, the laminates of the invention have particularly good peeling characteristics.

The present invention is more particularly elucidated hereinbelow.

Laminate

According to the invention, the laminate comprises at least one first layer of at least one first metal and at least one further layer of a polymer composition (PC).

What is meant in the context of the present invention by "at least one first layer" is either exactly one first layer or two or more first layers.

What is meant in the context of the present invention by "at least one first metal" is either exactly one first metal or a mixture of two or more first metals.

What is meant in the context of the present invention by "at least one further layer" is either exactly one further layer or two or more further layers.

The laminate preferably additionally comprises at least one second layer of at least one second metal, with the at least one first layer of at least one first metal joined to the at least one second layer of at least one second metal via the at least one further layer of the polymer composition (PC). In such a laminate, the at least one first layer is thus followed by at least one further layer which is in turn followed by at least one second layer.

Such a laminate which comprises at least one first layer, at least one further layer and at least one second layer is also known as a sandwich material.

The present invention therefore also provides a laminate where the laminate further comprises at least one second layer of at least one second metal and where the at least one first layer is joined to the at least one second layer via the at least one further layer.

The at least one first metal of the at least one first layer may be identical or different to the at least one second metal of the at least one second layer. The at least one first metal of the at least one first layer is preferably identical to the at least one second metal of the at least one second layer.

The laminate comprises at least one first layer of at least one first metal. In other words the laminate comprises at least one first layer made of at least one first metal.

The at least one first layer of at least one first metal has a thickness for example in the range from 0.1 to 0.6 mm, preferably in the range from 0.15 to 0.4 mm and especially preferably in the range from 0.18 to 0.3 mm.

The present invention therefore also provides a laminate where the at least one first layer has a thickness in the range from 0.1 to 0.6 mm.

The laminate preferably further comprises at least one second layer of at least one second metal. In other words the laminate preferably further comprises at least one second layer made of at least one second metal.

The at least one second layer of at least one second metal has a thickness for example in the range from 0.1 to 0.6 mm, preferably in the range from 0.15 to 0.4 mm and especially preferably in the range from 0.18 to 0.3 mm.

The present invention therefore also provides a laminate where the laminate further comprises at least one second layer of at least one second metal, wherein the at least one second layer has a thickness in the range from 0.1 to 0.6 mm.

The thickness of the at least one second layer may be identical or different to the thickness of the at least one first layer. The thickness of the at least one second layer is preferably identical to the thickness of the at least one first layer.

Suitable as the at least one first metal of the at least one first layer are any metals and metal alloys known to those skilled in the art which are solid at the production temperatures and the use temperatures of the laminate. The at least one first metal of the at least one first layer is preferably selected from the group consisting of iron, aluminum, copper, nickel and magnesium and also alloys thereof. The at least one first metal is more preferably an alloy of iron, and the at least one first metal is especially preferably steel.

The present invention therefore also provides a laminate where the at least one first metal of the at least one first layer is selected from the group consisting of iron, aluminum, copper, nickel and magnesium and also alloys thereof.

The present invention therefore also provides a laminate where the at least one first metal is selected from the group consisting of iron, aluminum, copper, nickel and magnesium and also alloys thereof.

Steel is known to those skilled in the art. In the context of the present invention "steel" is understood to mean alloys comprising iron as the primary constituent. This corresponds to the definition of steel according to DIN EN 10020:2000-07.

The at least one first metal may be coated or uncoated. The at least one first metal is preferably coated. Suitable coatings for the at least one first metal are known as such to those skilled in the art and are for example adhesion promoter layers, anticorrosion layers, paint, or zinc or magnesium coatings.

The at least one first metal is preferably zinc-coated. "Zinc-coated" means that the at least one first metal is coated with a further metal, in particular with zinc or alloys of zinc.

It is therefore particularly preferable when the at least one first metal is zinc-coated steel.

The zinc-coating of the at least one first metal may be carried out by methods known to those skilled in the art, for example by hot-dip zinc coating or by galvanic zinc coating.

If the at least one first metal is zinc-coated it may further have further coatings, for example adhesion promoter layers and/or paint. This is known to those skilled in the art.

The coating of the at least one first metal may be carried out by any methods known to those skilled in the art, for example the coating may be effected from an aqueous solution or a dispersion.

The above-described elucidations and preferences for the at least one first metal of the at least one first layer apply correspondingly to the at least one second metal of the at least one second layer.

The present invention therefore also provides a laminate where the laminate further comprises at least one second layer of at least one second metal, wherein the at least one second metal of the at least one second layer is selected from the group consisting of iron, aluminum, copper, nickel and magnesium and also alloys thereof.

The laminate comprises at least one further layer of a polymer composition (PC). What this means, in other words, is that the at least one further layer consists of the polymer composition (PC).

The at least one further layer of a polymer composition (PC) has a thickness for example in the range from 0.02 to 2 mm, preferably in the range from 0.05 to 1.5 mm and especially preferably in the range from 0.1 to 1 mm.

The present invention therefore also provides a laminate where the at least one further layer has a thickness in the range from 0.02 to 2 mm.

The present invention therefore also provides a laminate where the at least one first layer has a thickness in the range from 0.1 mm to 0.6 mm and/or where the at least one further layer has a thickness in the range from 0.02 mm to 2 mm.

Polymer Composition (PC)

According to the invention, the polymer composition (PC) comprises the following components: (A) at least one polyamide, (B) at least one first copolymer and (C) at least one second copolymer.

What is meant by "at least one polyamide" in the context of the present invention is either exactly one polyamide or a mixture (blend) of two or more polyamides.

What is meant in the context of the present invention by "at least one first copolymer" is either exactly one first copolymer or a mixture of two or more first copolymers.

What is meant in the context of the present invention by "at least one second copolymer" is either exactly one second copolymer or a mixture (blend) of two or more second copolymers.

In the context of the present invention, the terms "component (A)" and "at least one polyamide" are used synonymously and therefore have the same meaning.

Likewise used synonymously in the context of the present invention, and therefore likewise in each case having the same meaning, are the terms "component (B)" and "at least one first copolymer", and the terms "component (C) and "at least one second copolymer".

It will be clear to the person skilled in the art that the at least one first copolymer of the polymer composition (PC) differs from the at least one second copolymer of the polymer composition (PC). Component (B) is thus different than component (C).

The present invention therefore also provides a laminate in which component (B) present in the polymer composition (PC) is different than component (C) present in the polymer composition (PC).

The polymer composition (PC) may be produced by any methods known to those skilled in the art. For example, components (A), (B) and (C) present in the polymer composition (PC) are compounded in an extruder, and hence the polymer composition (PC) is obtained.

It will be clear to the person skilled in the art that components (A), (B) and (C) may be present in the polymer composition (PC) as a mixture (blend). In the production of the polymer composition (PC), there may also be at least partial interaction of components (A), (B) and (C) present in the polymer composition (PC). This is known to those skilled in the art.

In addition, the polymer composition (PC) may further comprise at least one filler.

What is meant by "at least one filler" in the context of the present invention is either exactly one filler or else a mixture of two or more fillers.

Suitable fillers include all fillers that are known to the person skilled in the art and can be mixed with components (A), (B) and (C) of the polymer composition (PC).

It is preferable when the at least one filler is selected from the group consisting of inorganic fillers, organic fillers and natural fillers.

The at least one filler is typically particulate. For example, the at least one filler may be a fiber material or take the form of spheres, for example. The at least one filler has, for example, an aspect ratio in the range from 1 to 15, preferably in the range from 1 to 10 and especially preferably in the range from 1 to 5. What is meant by the "aspect ratio" in the context of the present invention is the ratio of the greatest dimension of a particle of the at least one filler to the smallest dimension of a particle of the at least one filler.

In the context of the present invention, "fiber materials" are understood to mean all materials comprising fibers, for example individual fibers, fiber bundles (rovings), nonwoven fabrics, laid scrims, woven fabrics or knitted fabrics.

For example, the at least one filler is therefore selected from the group consisting of wollastonite, talc, boron fiber materials, glass fiber materials, carbon fiber materials, silica fiber materials, ceramic fiber materials, basalt fiber materials, metal fiber materials, aramid fiber materials, poly(p-phenylene-2,6-benzobisoxazole) fiber materials, polyester fiber materials, nylon fiber materials, polyethylene fiber materials, wood fiber materials, flax fiber materials, hemp fiber materials, coconut fiber materials and sisal fiber materials.

It is particularly preferable when the at least one filler is selected from the group consisting of glass fiber materials, carbon fiber materials, aramid fiber materials, poly(p-phenylene-2,6-benzobisoxazole) fiber materials, boron fiber materials, metal fiber materials, and potassium titanate fiber materials. It is especially preferable when the at least one filler is a glass fiber material.

The polymer composition (PC) preferably does not comprise any filler.

For example, the polymer composition (PC) comprises in the range from 40% to 99% by weight of component (A), preferably in the range from 55% to 85% by weight and especially preferably in the range from 60% to 80% by weight of component (A), based in each case on the sum total of the percentages by weight of components (A), (B) and (C) and of any at least one filler, preferably based on the total weight of the polymer composition (PC).

The present invention therefore also provides a laminate where the polymer composition (PC) comprises in the range from 40% to 99% by weight of component (A), based on the sum total of the percentages by weight of components (A), (B) and (C).

The polymer composition (PC) comprises, for example, in the range from 0.5% to 30% by weight of component (B), preferably in the range from 5% to 20% by weight and especially preferably in the range from 10% to 15% by weight of component (B), based in each case on the sum total of the percentages by weight of components (A), (B) and (C) and of any at least one filler, preferably based on the total weight of the polymer composition (PC).

The polymer composition (PC) comprises, for example, in the range from 0.5% to 50% by weight of component (C), preferably in the range from 5% to 40% by weight and especially preferably in the range from 10% to 30% by weight of component (C), based in each case on the sum total of the percentages by weight of components (A), (B) and (C) and of any at least one filler, preferably based on the total weight of the polymer composition (PC).

The polymer composition (PC) comprises, for example, in the range from 0.1% to 70% by weight of the at least one filler, preferably in the range from 0.5% to 60% by weight and especially preferably in the range from 1% to 50% by weight of the at least one filler, based in each case on the sum total of the percentages by weight of components (A), (B) and (C) and of the at least one filler, preferably based on the total weight of the polymer composition (PC).

The sum total of the percentages by weight of components (A), (B) and (C) and of any at least one filler typically add up to 100% by weight.

In addition, the polymer composition (PC) may comprise additives known to those skilled in the art. Additives which may be present in the polymer composition (PC) are selected, for example, from the group consisting of stabilizers, dyes, antistats, filler oils, surface improvers, siccatives, demolding aids, release agents, antioxidants, light stabilizers, PVC stabilizers, lubricants, flame retardants, blowing agents, impact modifiers, adhesion promoters, coupling agents and nucleating aids.

The present invention therefore also provides a laminate where the polymer composition (PC) further comprises at least one additive selected from the group consisting of stabilizers, dyes, antistats, filler oils, surface improvers, siccatives, demolding aids, release agents, antioxidants, light stabilizers, PVC stabilizers, lubricants, flame retardants, blowing agents, impact modifiers, adhesion promoters, coupling agents and nucleating aids.

These additives are known as such to the person skilled in the art. Coupling agents are also known as crosslinking agents. In the context of the present invention, "adhesion promoters" are understood to mean additives which further improve the adhesion of the polymer composition (PC) of the at least one further layer to the at least one first layer and optionally to the at least one second layer.

Component (A)

According to the invention, component (A) present in the polymer composition (PC) is at least one polyamide.

Polyamides are known as such to those skilled in the art.

Suitable polyamides generally have a viscosity number in the range from 70 to 350 ml/g, preferably in the range from 70 to 240 ml/g. The viscosity number is determined in accordance with the invention from a 0.5% by weight solution of the polyamide in 96% by weight sulfuric acid at 25° C. to ISO 307.

Preferred polyamides are semicrystalline polyamides. Suitable polyamides have a weight-average molecular weight ($M_w$) in the range from 500 to 2 000 000 g/mol, preferably in the range from 5000 to 500 000 g/mol and more preferably in the range from 10 000 to 100 000 g/mol. The weight-average molecular weight ($M_w$) is determined according to ASTM D4001.

Suitable polyamides include for example polyamides which derive from lactams having 7 to 13 ring members. Suitable polyamides further include polyamides obtained by reaction of dicarboxylic acids with diamines.

Examples of polyamides which derive from lactams include polyamides which derive from polycaprolactam, polycaprylolactam and/or polylaurolactam.

Suitable polyamides further include those obtainable from ω-aminoalkyl nitriles. A preferred ω-aminoalkyl nitrile is aminocapronitrile, which affords nylon-6. Dinitriles may moreover be reacted with diamine. Preference is given here to adipodinitrile and hexamethylenediamine, the polymerization of which affords nylon-6,6. The polymerization of nitriles is effected in the presence of water and is also known as direct polymerization.

If polyamides obtainable from dicarboxylic acids and diamines are used, it is possible to use dicarboxylic acid alkanes (aliphatic dicarboxylic acids) having 6 to 36 carbon atoms, preferably 6 to 12 carbon atoms, and more preferably 6 to 10 carbon atoms. Aromatic dicarboxylic acids are also suitable.

Examples of dicarboxylic acids here include adipic acid, azelaic acid, sebacic acid, dodecanedioic acid and also terephthalic acid and/or isophthalic acid.

Suitable diamines include for example alkanediamines having 4 to 36 carbon atoms, preferably alkanediamines having 6 to 12 carbon atoms, in particular alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane and 2,2-di(4-aminocyclohexyl)propane and also 1,5-diamino-2-methylpentane.

Preferred polyamides are polyhexamethyleneadipamide, polyhexamethylenesebacamide and polycaprolactam and also copolyamide 6/66, especially having a proportion of caprolactam units of 5% to 95% by weight.

Also suitable are polyamides obtainable by copolymerization of two or more of the monomers mentioned hereinabove and hereinbelow or mixtures of a plurality of polyamides in any desired mixing ratio. Particularly preferred mixtures are mixtures of polyamide 66 with other polyamides, in particular copolyamide 6/66.

Suitable polyamides are thus aliphatic, semiaromatic or aromatic polyamides. The term "aliphatic polyamides" means that the polyamides are formed exclusively from aliphatic monomers. The term "semiaromatic polyamides" means that the polyamides are formed of both aliphatic and aromatic monomers. The term "aromatic polyamides" means that the polyamides are formed exclusively from aromatic monomers.

The nonexhaustive list which follows comprises the aforementioned polyamides and further polyamides suitable for use in the laminate of the invention and also the monomers present.

AB Polymers:

| | |
|---|---|
| PA 4 | pyrrolidone |
| PA 6 | ε-caprolactam |
| PA 7 | enantholactam |
| PA 8 | caprylolactam |
| PA 9 | 9-aminopelargonic acid |
| PA 11 | 11-aminoundecanoic acid |
| PA 12 | laurolactam |

AA/BB Polymers:

| | |
|---|---|
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | dodecane-1,12-diamine, decanedicarboxylic acid |
| EB18-0821PC | |
| PA 1313 | 1,13-diaminotridecane, undecanedicarboxylic acid |
| PA 6T | hexamethylenediamine, terephthalic acid |
| PA 9T | nonyldiamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, laurolactam |
| PA 6I/6T/PACM | as PA 6I/6T and diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

The present invention thus also provides a laminate in which component (A) present in the polymer composition (PC) is selected from the group consisting of PA 4, PA 6, PA 7, PA 8, PA 9, PA 11, PA 12, PA 46, PA 66, PA 69, PA 510, PA 610, PA 612, PA 613, PA 1212, PA1313, PA 6T, PA MXD6, PA 6I, PA 6-3-T, PA 6/6T, PA 6/66, PA 66/6, PA 6/12, PA 66/6/610, PA 6I/6 T, PA PACM 12, PA 6I/6 T/PACM, PA 12/MACM1, PA 12/MACMT, PA PDA-T and copolyamides composed of two or more of the aforementioned polyamides.

Component (A) is preferably selected from the group consisting of nylon-6 (PA 6), nylon-6,6 (PA 6.6), nylon-6,10 (PA 6.10), nylon-6,12 (PA 6.12), nylon-12 (PA12), nylon-6,36 (PA 6.36), nylon-6/6,6 (PA 6/6.6), nylon-6/616T (PA 6/616T), nylon-6/6I (PA 6/6I), nylon-6/6,36 (PA 6/6.36) and nylon-6/6T (PA 6/6T).

Particularly preferred as component (A) are nylon-6 (PA 6), nylon-6/6,36 (PA 6/6.36) and/or nylon-6,6 (PA 66), particular preference being given to nylon-6 (PA 6) and nylon-6/6,36 (PA 6/6.36). Most preferred is nylon-6 (PA 6).

The present invention therefore also provides a laminate in which component (A) is selected from the group consisting of PA 6, PA 6.6, PA 6.10, PA 6.12, PA 12, PA 6.36, PA 6/6.6, PA 6/616T, PA 6/6I, PA 6/6.36 and PA 6/6T.

Component (A) typically also has a melting temperature ($T_{M(A)}$). The melting temperature ($T_{M(A)}$) of component (A) is, for example, in the range from 170 to 320° C., preferably in the range from 180 to 240° C. and especially preferably in the range from 190 to 230° C., determined in accordance with ISO 11357-3:2014.

For determination of the melting temperature ($T_{M(A)}$) to ISO 11357-3:2014, component (A) is typically used in pelletized form. The pellets of component (A) in that case typically have a size in the range from 1 mm to 10 mm.

The melt volume flow rate (MVR) (275° C./5 kg) of component (C) is, for example, in the range from 100 to 500 cm$^3$/10 min, determined to ISO 1133.

Component (B)

According to the invention, component (B) is at least one first copolymer. Component (B) is obtainable by polymerizing at least the following components:

(B1) at least one first $C_2$-$C_{20}$-alkene and (B2) at least one second $C_2$-$C_{20}$-alkene, where components (B1) and (B2) are different than one another.

What is meant by "at least one first $C_2$-$C_{20}$-alkene" in the context of the present invention is either exactly one first $C_2$-$C_{20}$-alkene or a mixture of two or more first $C_2$-$C_{20}$-alkenes.

What is meant by "at least one second $C_2$-$C_{20}$-alkene" in the context of the present invention is either exactly one second $C_2$-$C_{20}$-alkene or a mixture of two or more second $C_2$-$C_{20}$-alkenes.

In the context of the present invention the terms "component (B1)" and "at least one first $C_2$-$C_{20}$-alkene" are used synonymously and therefore have the same meaning.

The same applies to the terms "component (B2)" and "at least one second $C_2$-$C_{20}$-alkene". These terms are likewise used synonymously in the context of the present invention and therefore have the same meaning.

Component (B1) is preferably at least one first $C_2$-$C_{12}$-alkene and especially preferably at least one first $C_2$-$C_8$-alkene.

In the context of the present invention, a $C_2$-$C_{20}$-alkene is understood to mean an unsubstituted or at least monosubstituted hydrocarbon having 2 to 20 carbon atoms and at least one carbon-carbon double bond (C—C double bond). What is meant in the context of the present invention by "at least one carbon-carbon double bond" is either exactly one carbon-carbon double bond or two or more carbon-carbon double bonds.

In other words, what is meant by $C_2$-$C_{20}$-alkenes is that the hydrocarbons having 2 to carbon atoms are unsaturated. The hydrocarbons may be branched or unbranched. Examples of $C_2$-$C_{20}$-alkenes having exactly one C—C double bond are ethene, propene, 1-butene, 2-butene, 2-methylpropene (isobutylene), 1-pentene, 2-pentene, 2-methyl-1-butene, 3-methyl-1-butene, 1-hexene, 2-hexene, 3-hexene, octene and 4-methyl-1-pentene. Examples of $C_2$-$C_{20}$-alkenes having 2 or more C—C double bonds are allene, 1,3-butadiene, 1,4-pentadiene, 1,3-pentadiene and 2-methyl-1,3-butadiene (isoprene).

For example, component (B1) is selected from the group consisting of ethene, propene, 1-butene, 2-butene, 2-methylpropene (isobutylene), 1-pentene, 2-pentene, 2-methyl-1-butene, 3-methyl-1-butene, 1-hexene, 2-hexene, 3-hexene, octene, 1,3-butadiene and 4-methyl-1-pentene. Component (B1) is preferably selected from the group consisting of ethene, propene, 1-butene, 2-butene, 1,3-butadiene, octene and 2-methylpropene (isobutylene), and component (B1) is most preferably selected from ethene, propene, octene and 1,3-butadiene.

The present invention therefore also provides a laminate in which component (B1) is selected from the group consisting of ethene, propene, 1-butene, 2-butene, octene and butadiene.

The details and preferences described above for component (B1) are correspondingly applicable to component (B2), with the proviso that component (B2) is different than component (B1).

The present invention therefore also provides a laminate in which component (B2) is selected from the group consisting of ethene, propene, 1-butene, 2-butene, octene and butadiene.

For polymerization at least of components (B1) and (B2), for example, in the range from 50 to 99 mol % of component (B1) and preferably in the range from 60 to 85 mol % of component (B1) is used, based in each case on the total amount of components (B1) and (B2).

For example, in the polymerization at least of components (B1) and (B2), in the range from 1 to 50 mol % of component (B2) and preferably in the range from 15 to 40 mol % of component (B2) is used, based in each case on the total amount of components (B1) and (B2).

In the polymerization of components (B1) and (B2), it is additionally possible to use a component (B3), at least one catalyst. Suitable catalysts are known as such to those skilled in the art.

In addition, it is possible to use a component (B4), at least one further monomer. Component (B4) preferably serves for functionalization in the polymerization of the components. Suitable components (B4) are, for example, maleic anhydride.

The present invention therefore also provides a laminate in which component (B) is obtainable by polymerizing an additional component (B4), maleic anhydride.

For example, in the range from 0.1% to 5% by weight of component (B4) and preferably in the range from 0.5% to 1% by weight of component (B4) is used, based in each case on the sum total of the percentages by weight of components (B1), (B2) and (B4) and of any component (B3).

It will be apparent that the molar percentages and percentages by weight of components (B1), (B2) and of any components (B3) and (B4) relate to the molar percentages and percentages by weight of the components prior to polymerization, i.e. before the components have reacted with one another. It will be apparent that the molar percentages and percentages by weight may possibly change during the polymerization.

The at least one first copolymer may be a block copolymer or a random copolymer. The at least one first copolymer is preferably a block copolymer.

A block copolymer comprises alternating blocks obtainable by polymerizing component (B1) with blocks obtainable by polymerizing component (B2).

In a random copolymer, the arrangement of repeat units obtainable by polymerizing component (B1) and those obtainable by polymerizing component (B2) is random. For example, a block obtainable by polymerizing component (B1) is followed by two blocks obtainable by polymerizing component (B2), and these in turn are followed by five blocks obtainable by polymerizing component (B1), and these in turn are followed by three blocks obtainable by polymerizing component (B2).

Component (B) typically has a glass transition temperature ($T_{G(B)}$). For example, the glass transition temperature ($T_{G(B)}$) of component (B) is in the range from $-100$ to $20°$ C., preferably in the range from $-50$ to $-20°$ C., determined to ISO 11357-2:2014.

In the context of the present invention, the glass transition temperature ($T_{G(B)}$) of component (B) relates, in accordance with ISO 11357-2:2014, to the glass transition temperature ($T_{G(B)}$) of the dry component (B).

What is meant by "dry" in the context of the present invention is that component (B) comprises less than 1% by weight of water, preferably less than 0.5% by weight and especially less than 0.1% by weight of water, based in each case on the total weight of component (B). What is more preferably meant by "dry" is that component (B) comprises no water, and most preferably that component (B) comprises no solvent.

The melt flow rate (MFR) (230° C./10 kg) of component (B) is, for example, in the range from 0.1 to 20 g/10 min, preferably in the range from 1 to 15 g/10 min, determined to ISO 1133.

Component (C)

According to the invention, the polymer composition (PC) comprises at least one second copolymer as component (C).

Component (C) is obtainable by polymerizing at least the following components:
- (C1) at least one third $C_2$-$C_{20}$-alkene and
- (C2) at least one acrylic acid derivative.

What is meant by "at least one third $C_2$-$C_{20}$-alkene" in the context of the present invention is either exactly one third $C_2$-$C_{20}$-alkene or a mixture of two or more third $C_2$-$C_{20}$-alkenes.

What is meant by "at least one acrylic acid derivative" in the context of the present invention is either exactly one acrylic acid derivative or a mixture of two or more acrylic acid derivatives.

In the context of the present invention, the terms "component (C2)" and "at least one third $C_2$-$C_{20}$-alkene" are used synonymously and therefore have the same meaning.

The same applies to the terms "component (C2)" and "at least one acrylic acid derivative". These terms are likewise used synonymously in the context of the present invention and have the same meaning.

The details and preferences described above for the above-described component (B1) are correspondingly applicable to component (C1).

The present invention therefore also provides a laminate in which component (C1) is selected from the group consisting of ethene, propene, 1-butene, 2-butene, octene and butadiene.

According to the invention, component (C2) is at least one acrylic acid derivative. In the context of the present invention, an acrylic acid derivative is understood to mean acrylic acid, methacrylic acid and compounds derived therefrom, such as, in particular, acrylic esters and acryloyl halides, and methacrylic esters and methacryloyl halides.

The present invention therefore also provides a laminate in which component (C2) is selected from the group consisting of acrylic acid, acrylic esters, acryloyl halides, methacrylic acid, methacrylic esters methacryloyl halides.

The present invention further provides a laminate in which component (C2) is selected from the group consisting of acrylic acid, acrylic esters and acryloyl halides.

Acrylic acid is also referred to as propenoic acid and is known as such to the person skilled in the art. Acrylic esters are formed in the reaction of acrylic acid with alcohols. Acrylic esters are also referred to as alkyl acrylates.

For example, component (C2) is selected from the group consisting of acrylic acid, methyl acrylate, ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate and 3,5,5-trimethylhexyl acrylate.

Methyl acrylate is also referred to as acrylic acid methyl ester, ethyl acrylate is also referred to as acrylic acid ethyl ester, and butyl acrylate is also referred to as acrylic acid butyl ester.

Component (C2) is preferably selected from the group consisting of acrylic acid methyl ester, acrylic acid butyl ester and acrylic acid.

The present invention therefore also provides a laminate in which component (C2) is selected from the group consisting of acrylic acid methyl ester, acrylic acid butyl ester and acrylic acid.

For example, in the polymerization at least of components (C1) and (C2), in the range from 50% to 99% by weight of component (C1) is used, and preferably in the range from 60% to 95% by weight, based in each case on the sum total of the percentages by weight of components (C1) and (C2).

For example, in the polymerization of components (C1) and (C2), in the range from 1% to 50% by weight of component (C2) and preferably in the range from 5% to 40% by weight of component (C2) is used, based in each case on the sum total of the percentages by weight of components (C1) and (C2).

In the polymerization of components (C1) and (C2), it is additionally possible to use a component (C3), at least one catalyst. Suitable catalysts are known as such to those skilled in the art.

In addition, it is possible to use a component (C4), at least one further monomer. Component (C4) preferably serves for functionalization in the polymerization of the components. Suitable components (C4) are, for example, maleic anhydride.

For example, in the range from 0.01% to 3% by weight of component (C4) and preferably in the range from 0.1% to 2% by weight of component (C4) is used, based in each case on the sum total of the percentages by weight of components (C1), (C2) and (C4) and of any component (C3).

It will be apparent that the percentages by weight of components (C1), (C2) and of any components (C3) and (C4) relate to the percentages by weight of the components prior to polymerization, i.e. before the components have reacted with one another. It will be apparent that the percentages by weight may possibly change during the polymerization.

The at least one second copolymer may be a block copolymer or a random copolymer. The at least one second copolymer is preferably a block copolymer.

A block copolymer comprises alternating blocks obtainable by polymerizing component (B1) with blocks obtainable by polymerizing component (B2).

In a random copolymer, the arrangement of repeat units obtainable by polymerizing component (C1) and those obtainable by polymerizing component (C2) is random. For example, a block obtainable by polymerizing component (C1) is followed by two blocks obtainable by polymerizing component (C2), and these in turn are followed by five blocks obtainable by polymerizing component (C1), and these in turn are followed by three blocks obtainable by polymerizing component (C2).

Component (C) typically has a melting temperature ($T_{M(C)}$). The melting temperature ($T_{M(C)}$) of component (C) is, for example, in the range from 50 to 150° C., preferably in the range from 90 to 110° C., determined to ISO 11357-3:2014.

The melt flow rate (MFR) (190° C./2.16 kg) of component (C) is, for example, in the range from 0.1 to 20 g/10 min, preferably in the range from 0.1 to 5 g/10 min, determined to ISO 1133.

Production

The laminate of the invention may be produced by any methods known to those skilled in the art.

It is preferable when the laminate is produced in a continuous process.

The laminate of the invention is preferably produced in a process comprising the following steps of:
a) providing a film of a polymer composition (PC) comprising the following components:
  (A) at least one polyamide,
  (B) at least one first copolymer obtainable by polymerizing at least the following components:
    (B1) at least one first $C_2$-$C_{20}$-alkene and
    (B2) at least one second $C_2$-$C_{20}$-alkene,
    where components (B1) and (B2) are different than one another, (C) at least one second copolymer obtainable by polymerizing at least the following components:
(C1) at least one third $C_2$-$C_{20}$-alkene and
(C2) at least one acrylic acid derivative,
b) heating a first sheet of at least one first metal,
c) pressing the heated first sheet from step b) with the film provided in step a) to obtain the laminate.

The present invention therefore also provides a process for producing a laminate of the invention, comprising the steps of
a) providing a film of a polymer composition (PC) comprising the following components:
(A) at least one polyamide,
(B) at least one first copolymer obtainable by polymerizing at least the following components:
(B1) at least one first $C_2$-$C_{20}$-alkene and
(B2) at least one second $C_2$-$C_{20}$-alkene,
where components (B1) and (B2) are different than one another,
(C) at least one second copolymer obtainable by polymerizing at least the following components:
(C1) at least one third $C_2$-$C_{20}$-alkene and
(C2) at least one acrylic acid derivative,
b) heating a first sheet of at least one first metal,
c) pressing the heated first sheet from step b) with the film provided in step a) to obtain the laminate.

The above-described elucidations and preferences for the polymer composition (PC) of the laminate of the invention apply correspondingly to the polymer composition (PC) in the process of the invention. The above-described elucidations and preferences for components (A), (B) and (C) of the laminate likewise apply correspondingly to components (A), (B) and (C).

Step a) comprises providing a film of the polymer composition (PC). The film provided in step a) consists of the polymer composition (PC).

Processes for providing a film of a polymer composition (PC) are known as such to those skilled in the art. Step a) preferably comprises providing the film by an extrusion method.

The present invention therefore also provides a process in which the film is provided in step a) by an extrusion method.

Suitable extrusion methods for providing the film of the polymer composition (PC) are known to those skilled in the art and include, for example, casting methods, calendering methods, blowing methods or multi-blowing methods.

The film of the polymer composition (PC) provided in step a) may have any desired thicknesses. The film of the polymer composition (PC) provided in step a) typically has a thickness in the range from 1% to 20% greater than the at least one further layer of the laminate to be produced, preferably in the range from 2% to 15% greater than the at least one further layer of the laminate to be produced and especially preferably in the range from 4% to 10% greater than the at least one further layer of the laminate to be produced.

Step b) comprises heating a first sheet of at least one first metal. The first sheet is made of the at least first metal. The above-described details and preferences for the first metal present in the laminate are correspondingly applicable to the at least one first metal. The first sheet can be heated by any methods known to the person skilled in the art; preference is given to inductive heating of the first sheet in step b).

The present invention therefore also provides a process in which the first sheet is heated in step b) by inductive means.

Step b) may comprise heating the first sheet to any desired temperature. Step b) preferably comprises heating the first sheet to a temperature above the melting temperature ($T_{M(PC)}$) and below the decomposition temperature of the polymer composition (PC).

Step b) preferably comprises heating the first sheet to a temperature in the range from 150° C. to 350° C., more preferably in the range from 210° C. to 280° C. and especially preferably in the range from 220° C. to 250° C.

The present invention therefore also provides a process in which step b) comprises heating the first sheet to a temperature in the range from 150° C. to 350° C.

Step c) comprises pressing the heated first sheet from step b) with the film provided in step a) to obtain the laminate. This joins the film to the first sheet. This may reduce the thickness of the film.

Processes for pressing in step c) the heated first sheet from step b) with the film provided in step a) are known as such to those skilled in the art.

The steps b) and c) may be performed simultaneously or consecutively. It is preferable when the steps b) and c) are performed simultaneously. In that case, the first sheet is heated while being pressed with the film provided in step a).

The laminate obtained in step c) is typically cooled. Cooling may be carried out by any processes known to those skilled in the art, for example by blowing compressed air onto the laminate. The laminate is preferably cooled while maintaining the pressing pressure.

In the laminate obtained, the heated first sheet is the at least one first layer of at least one first metal, and the film is the at least one further layer of the polymer composition (PC).

If the laminate is to comprise at least one second layer an additional step b1) comprising heating a second sheet of at least one second metal is performed. The above-described elucidations and preferences for the heating of the first sheet in step b) apply correspondingly to the heating of the second sheet in step b1).

Step c) then comprises pressing the heated first sheet with the heated second sheet from step b1) while the film provided in step a) is disposed between the two sheets.

The process for producing the laminate of the invention then typically comprises the following steps of:
a) providing a film of a polymer composition (PC) comprising the following components:
(A) at least one polyamide,
(B) at least one first copolymer obtainable by polymerizing at least the following components:
(B1) at least one first $C_2$-$C_{20}$-alkene and
(B2) at least one second $C_2$-$C_{20}$-alkene,
where components (B1) and (B2) are different than one another,
(C) at least one second copolymer obtainable by polymerizing at least the following components:
(C1) at least one third $C_2$-$C_{20}$-alkene and
(C2) at least one acrylic acid derivative,
b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The present invention therefore also provides a process for producing a laminate of the invention which additionally comprises at least one second layer of at least one second metal and where the at least one first layer is joined to the at least one second layer via the at least one further layer, comprising the steps of a) providing a film of a polymer composition (PC) comprising the following components:
  (A) at least one polyamide,
  (B) at least one first copolymer obtainable by polymerizing at least the following components:
    (B1) at least one first $C_2$-$C_{20}$-alkene and
    (B2) at least one second $C_2$-$C_{20}$-alkene,
    where components (B1) and (B2) are different than one another,
  (C) at least one second copolymer obtainable by polymerizing at least the following components:
    (C1) at least one third $C_2$-$C_{20}$-alkene and
    (C2) at least one acrylic acid derivative,
b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The above-described elucidations and preferences for any at least one second metal of the at least one second layer present in the laminate apply correspondingly to the at least one second metal of the second sheet in the process of the invention.

The above-described elucidations and preferences for the first sheet and the heating of the first sheet apply correspondingly to the second sheet and the heating of the second sheet.

The above-described elucidations and preferences for step c) likewise apply correspondingly to step c) in which the second sheet is additionally positioned.

Preference is given to conducting a step d) after step c):
d) forming the resultant laminate at a forming temperature ($T_U$) to obtain a formed laminate.

Step d) is also referred to as thermoforming of the laminate. This process is known as such to those skilled in the art. This involves introducing the laminate into a mold and heating it to the forming temperature ($T_U$), which deforms it.

The forming temperature ($T_U$) is preferably above the glass transition temperature ($T_{G(PC)}$) of the polymer composition (PC) and below the melting temperature ($T_{M(C)}$) of the polymer composition (PC). For example, the forming temperature ($T_U$) is in the range from 55 to 150° C., preferably in the range from 60 to 90° C. and especially preferably in the range from 60 to 80° C.

The present invention is more particularly elucidated hereinbelow with reference to examples without being limited thereto.

EXAMPLES

The following components were used:
Polyamide
P1: nylon-6 (Ultramid B24N from BASF SE)
Copolymers
Co1: Lucalen A2700 M (Basell); ethylene/n-butyl acrylate copolymer (MFR (190° C./2.16 kg to ISO 1133) 7.2 g/10 min)
Co2: Lucalen A2540 D (Basell); ethylene/n-butyl acrylate copolymer (MFR (190° C./2.16 kg to ISO 1133) 0.25 g/10 min)
Co3: Lucalen A2910 M (Basell); ethylene/t-butyl acrylate/acrylic acid copolymer (MFR (190° C./2.16 kg to ISO 1133) 7 g/10 min)
Co4: Exxelor 1801 (Exxon Chemicals); ethylene/propylene/MA copolymer;
Co5: Lupolen 1800s (Basell); ethylene/propylene/MA copolymer; LDPE (low density polyethylene)
Additives:
A1: Irganox (antioxidant)
A2: Talc
First and Second Metal
Steel
Production of the Laminates The polymers specified in table 1, in the amount specified in table 1, were compounded with a ZE 25A UXTI twin-screw extruder and extruded to a film of thickness 430 μm and width 53 cm. The amounts specified in table 1 are all in % by weight.

The films of the polymer composition (PC) and of the first sheet and the second sheet of the steel were stored at 80° C. for 7 days prior to the production. For production of the laminate, the first sheet of steel and the second sheet of steel were inserted into an apparatus, and a film of the polymer composition was inserted between the first sheet and the second sheet. The sheets were pressed and heated inductively to a temperature of 240° C. within 3 seconds, and kept at that temperature for 7 seconds. The laminate was subsequently cooled with compressed air for 20 seconds and the pressing force was released during further cooling to room temperature.

The resultant laminates were cut into strips of width 40 mm and subjected to a peel test to ASTM D1876. The results can likewise be seen in table 1.

TABLE 1

| | | Example 1 | Example 2 | Example 3 | Comparative example 4 |
|---|---|---|---|---|---|
| P1 | [% by wt.] | 59.1 | 59.1 | 59.1 | 59.1 |
| Co1 | [% by wt.] | 25 | | | |
| Co2 | [% by wt.] | | 25 | | |
| Co3 | [% by wt.] | | | 25 | |
| Co4 | [% by wt.] | 15 | 15 | 15 | 15 |
| Co5 | [% by wt.] | | | | 25 |
| A1 | [% by wt.] | 0.5 | 0.5 | 0.5 | 0.5 |
| A2 | [% by wt.] | 0.4 | 0.4 | 0.4 | 0.4 |
| Peel test | [N/40 m] | 616 | 798 | 460 | 337 |

The laminate of the invention has particularly good peeling properties.

The invention claimed is:

1. A laminate comprising at least one first layer of at least one first metal and at least one further layer of a polymer composition (PC), wherein the polymer composition (PC) comprises the following components:
  (A) 55% to 85% by weight of at least one polyamide selected from the group consisting of PA 6, PA 6.6, PA 6.10, PA 6.12, PA 12, PA 6.36, PA 6/6.6, PA 6/6I6T, PA 6/6I, PA 6/6.36 and PA 6/6T,
  (B) 5% to 20% by weight of at least one first copolymer obtainable by polymerizing at least the following components:
    (B1) at least one first $C_2$-$C_{20}$-alkene selected from the group consisting of ethene, propene, 1-butene, 2-butene, octene and butadiene,
    (B2) at least one second $C_2$-$C_{20}$-alkene selected from the group consisting of ethene, propene, 1-butene, 2-butene, octene and butadiene, and
    (B4) maleic anhydride, wherein components (B1) and (B2) are different than one another, and (C) 10% to 30% by weight of at least one second copolymer obtainable by polymerizing at least the following components:

(C1) at least one third $C_2$-$C_{20}$-alkene selected from the group consisting of ethene, propene, 1-butene, 2-butene, octene and butadiene, and (C2) at least one acrylic acid derivative selected from the group consisting of methyl acrylate, butyl acrylate and acrylic acid;

wherein the laminate has a peel strength of at least 460 N/40 m for a peel test according to ASTM D1876.

2. The laminate according to claim 1, wherein the laminate additionally comprises at least one second layer of at least one second metal and wherein the at least one first layer is joined to the at least one second layer via the at least one further layer.

3. The laminate according to claim 1, wherein the at least one first metal is selected from the group consisting of iron, aluminum, copper, nickel and magnesium and also alloys thereof.

4. The laminate according to claim 1, wherein the at least one first layer has a thickness in the range from 0.1 mm to 0.6 mm and/or wherein the at least one further layer has a thickness in the range from 0.02 to 2 mm.

5. A process for producing a laminate according to claim 1, comprising the steps of a) providing a film of a polymer composition (PC) comprising the following components:

(A) at least one polyamide, (B) at least one first copolymer obtainable by polymerizing at least the following components:

(B1) at least one first $C_2$-$C_{20}$-alkene and (B2) at least one second $C_2$-$C_{20}$-alkene, where components (B1) and (B2) are different than one another, and (C) at least one second copolymer obtainable by polymerizing at least the following components:

(C1) at least one third $C_2$-$C_{20}$-alkene and (C2) at least one acrylic acid derivative, b) heating a first sheet of at least one first metal, and c) pressing the heated first sheet from step b) with the film provided in step a) to obtain the laminate.

6. The process according to claim 5, wherein step b) comprises heating the first sheet to a temperature in the range from 150° C. to 350° C.

7. The process according to claim 5, wherein the heating of the first sheet in step b) is effected by inductive means.

8. The process according to claim 5, wherein step a) comprises providing the film by an extrusion process.

* * * * *